May 27, 1958 — M. A. MOSKOVITZ — 2,836,442
DUST SEALS FOR BALL JOINTS
Filed July 19, 1955 — 3 Sheets-Sheet 1

INVENTOR.
MILTON A. MOSKOVITZ
BY Ben V. Zillman
ATTORNEY

May 27, 1958 M. A. MOSKOVITZ 2,836,442
DUST SEALS FOR BALL JOINTS
Filed July 19, 1955 3 Sheets-Sheet 2

INVENTOR.
MILTON A. MOSKOVITZ
BY Ben V. Zillman
ATTORNEY

May 27, 1958  M. A. MOSKOVITZ  2,836,442
DUST SEALS FOR BALL JOINTS
Filed July 19, 1955  3 Sheets-Sheet 3
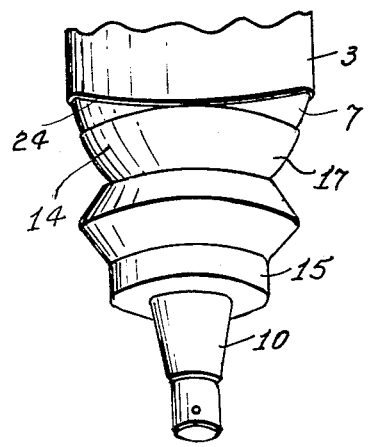
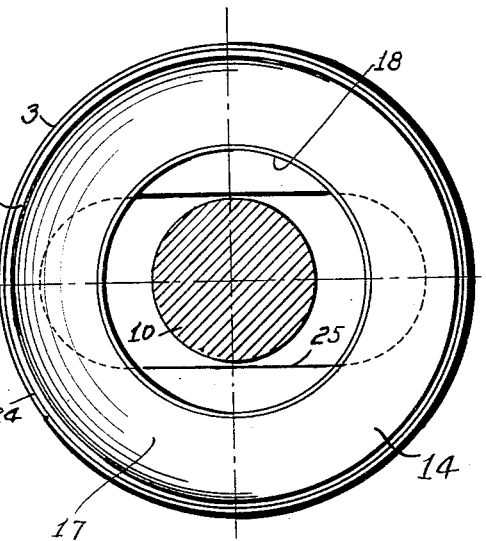
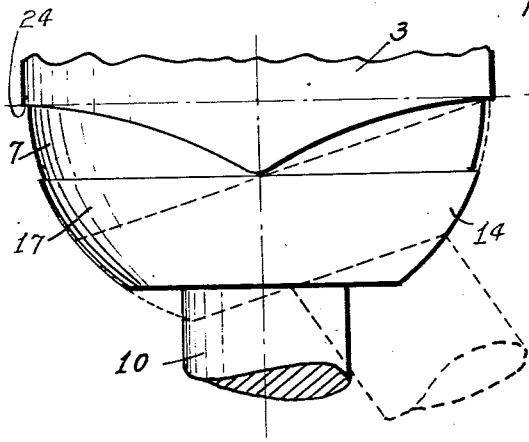
INVENTOR.
MILTON A. MOSKOVITZ
BY Ben V. Zillman
ATTORNEY United States Patent Office 2,836,442
Patented May 27, 1958

2,836,442

DUST SEALS FOR BALL JOINTS

Milton A. Moskovitz, Richmond Heights, Mo.

Application July 19, 1955, Serial No. 522,919

6 Claims. (Cl. 286—15)

This invention relates to ball joints generally of the kind used in motor vehicle construction, but more especially to dust seals associated with such joints.

The invention has among its general objects the production of such seals that will be simple in design and construction, will perform their intended functions efficiently throughout the full range of movement of the joint parts, and which will be otherwise safe, satisfactory and efficient for use wherever found applicable.

One of the principal objects of my invention is to so construct such a dust seal that there is full coverage of the joint opening throughout the full amplitude of swing or tilt of the stud element of the joint structure, and to obtain this coverage without impairing the strength of said stud through any reduction of its effective diameter that has been determined necessary for safety and strength of such stud.

Another object of the invention is to so construct such a seal of a minimum number of component sections that will insure adequate joint opening coverage even where more than a single dust seal element is required to accommodate a relatively wide angle of stud swing.

An added object of my invention is to provide stop arrangements for the seal elements of such a joint structure, so that over-travel of the seal elements sufficient to uncover the joint opening, is prevented.

A further object of the invention is to design such a seal by precise mathematical computation from predetermined known factors such as the stud diameter, radii of the inner and outer bearing surfaces of the joint housing and maximum angle of stud swing, and from these ascertaining the sizes of the other elements cooperating with said stud and housing, as for example the minimum included or subtended angles of coverage by the dust seal elements.

Yet another object of my invention is to so construct such a joint wherein the inner seal element that is superimposed on the socket housing is restricted for swing in substantially only a single plane.

A still further object of the invention is to have in such a joint construction, seal elements that are of dimensions that have been mathematically computed in advance of their construction, and with reference to a horizontal plane passed through the common center of curvature of the socket member bearing surfaces and common center of swing of the stud and seal elements so as to obtain maximum seal coverage of the joint housing opening with or without overlap of said opening by said seal elements, and also to ascertain the placement of the stop means, with reference to said horizontal plane, for halting the swing of said seal.

Referring to the drawings, wherein like reference characters represent like or corresponding parts throughout the views, Figure 1 is a fragmentary vertical cross-sectional view through the joint as mounted in position on a motor vehicle, showing the stud at the mid-point of its swing amplitude;

Figure 6 is a perspective fragmentary view, showing a joint wherein the swing of the inner seal element is restricted to substantially a single plane;

Figure 7 is a plan view of the same, as viewed from beneath; and

Figure 8 is an elevational view of the parts shown in Fig. 6.

Figure 1:
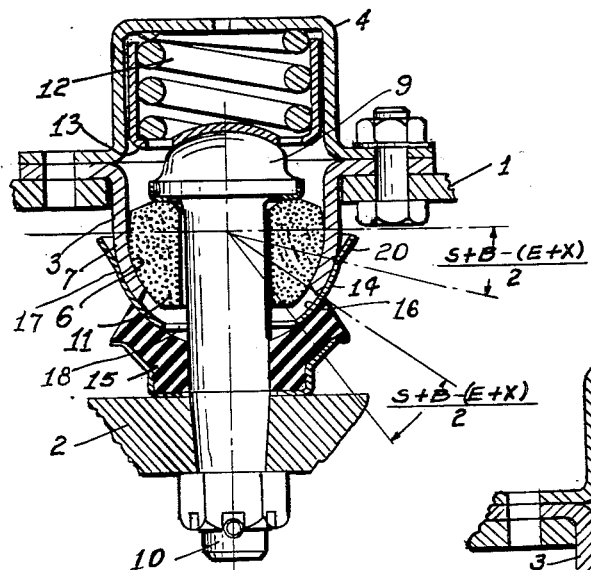

Referring more especially to the drawings, wherein I have illustrated preferred embodiments of my invention, there is shown a ball joint structure of the type adapted to be in motor vehicle construction, as for example, as a movable interconnection between the control arms and the steerable wheels of the vehicle.

Although the use of ball joint suspensions is constantly increasing, it has become increasingly difficult to so design such joints that they will effectively seal out water, dirt or other foreign matter, the difficulty arising principally on account of the wide amplitude of stud swing that is required to accommodate the proper movement of the parts of such a joint.

It must also be remembered that in order to properly allow for the jounce and the rebound action of the vehicle parts to which the joint is attached, it is necessary that the stud swing be through a rather large amplitude, and in this instance is shown as of about 64°.

One of the ways of securing sufficient seal coverage for the opening of the socket, for a joint wherein the stud has such a wide angle of swing, was to "neck down" or diametrally reduce the stud section at that portion of its length that was in the path of the bounding wall of the socket opening through which the stud projected, and sometimes use a one-piece dust boot or seal to keep the socket opening covered.

However, it is obvious that any such reduction in the effective diameter of the stud shank, once the size of stud section has been decided on for proper and safe strength, would proportionately decrease such strength and hence render use of such a weakened stud dangerous. Also, such a necking makes it uneconomical to manufacture such a shape of stud in comparison with making such studs without such a cut-out and which can be made in the usual and well-known cold-heading process.

In the drawings, 1 indicates one of the control arms of the vehicle, and 2 a part of the steering knuckle that is spaced therefrom, these parts adapted to be movably interconnected through a ball-joint structure that includes a housing or socket member 3 carried by said arm and which is closed at one end (at the top as herein shown), by a cap 4, said socket member having its interior hollowed or chambered and provided toward the lower end with preferably concentric segmentally spherical internal and external bearing surfaces 6 and 7, respectively, there being an opening 5 through said lower end.

A stud is mounted within said housing chamber, so as to be freely tiltable and rotatable therein, having a radially enlarged head 9 and with its shank 10 projecting outwardly through and beyond said opening 5, for detachable interconnection to a portion of the knuckle element 2.

Intermediate said stud and the inner concave bearing surface of the socket there is a bushing 11, that encircles said stud shank and is actuated by the stud, this bushing formed with an exterior convex surface that is complemental to the inner concave bearing surface of the socket so as to be free to rotate and tilt and slidably engage the latter during movement of the stud.

Resiliently yieldable means, as for instance the coil spring 12 presses a pressure element 13 constantly against the head of said stud to maintain the parts in their desired relationship.

The opening through the lower end of the housing or socket is of such a size and shape as to permit of a predetermined and generally large degree or amplitude of stud tilt, and in this instance said amplitude is shown as being of about 64°, and the stud shank being adapted to substantially abut the bounding wall of the socket opening at the ends of swing.

In order to prevent entry of water, dirt and other foreign matter into the housing opening, I have provided a dust seal means of a minimum number of sections or components, that will effectively maintain said opening closed at all positions of stud tilt, and especially so at both ends of stud swing.

To accomplish this result, and taking into account the very wide angle of swing, said dust seal means comprises a pair of nested inner and outer seal elements 14 and 15 respectively, and in this case the latter has been formed principally of a rubber-like material.

Said inner seal is substantially cup or dome-shaped and preferably segmentally spherical on its inner and outer concentric surfaces 16 and 17 respectively, with its centers of curvature being common to those of the spherical surfaces 6 and 7, so that the slidably engaging faces of the inner seal and the socket will have a relatively good fit, and maintain the socket opening covered, as hereinafter set forth.

Figure 2:
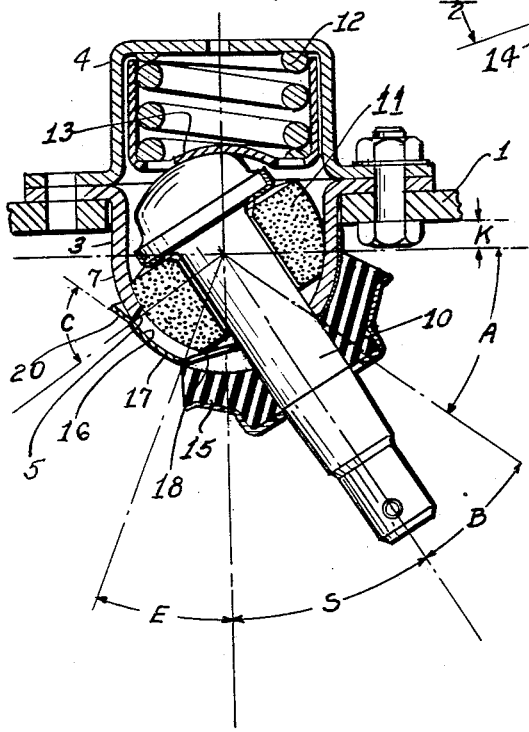
Figure 2 is a similar view, showing the stud at one of its end limits of swing.

This inner seal has an opening 18 centrally therethrough, of a smaller size than the socket opening, and it is to be noted from inspection of Fig. 2, that when the seal has been actuated to one end of its swing by the stud, there is no overlapping engagement of the stud opening by the other end of the seal. In other words, the sizes of the parts are such that the seal will just cover the socket opening without overlap, at the end limits of seal swing.

The outer seal is bored centrally to snugly receive the stud shank therethrough and has its inner face substantially concave and with the rim thereof in slidable engagement with the convex exterior surface of the inner seal.

Figure 3:
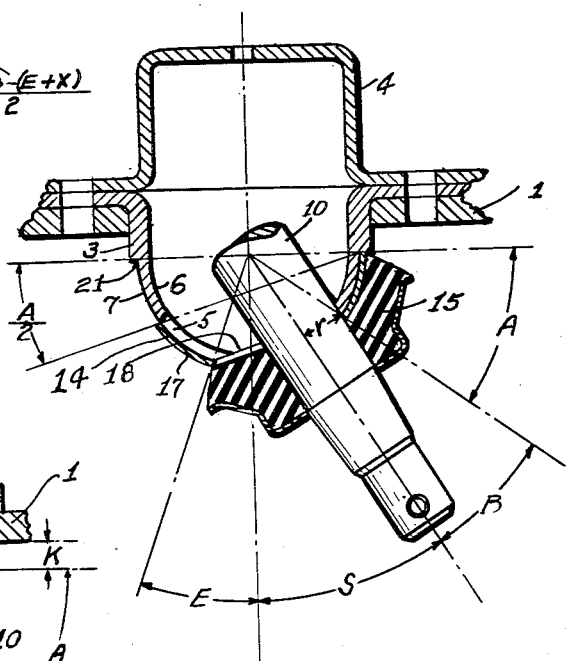
Figure 3 is another similar view, showing the stud at one limit of swing, with a modified form of stop means, and with some of the internal parts of the joint omitted.

It is obvious that as the stud swings or tilts in either direction, say to the right as shown in Fig. 2, from its mid-point position, the outer seal always swing in unison therewith, while the movement of the inner seal lags relatively to the commencement of outer seal swing. However, as soon as the stud has moved to approximately engage the adjacent edge of the inner seal opening, the seals then continue movement together, in the same advancing direction, until the stud shank substantially abuts the radially innermost edge of the socket opening. In Figs. 1–3 there is no overlap provided of the bounding edge of the inner seal relative to the socket opening at the limits of swing.

To prevent any possibility of the inner seal being moved (as it advances) sufficiently to have any portion uncovering the socket opening, I have provided stop means that will positively stop further swing of the inner seal beyond its predetermined amplitude of swing, these means being operative at the ends of stud swing and interacting between said inner seal and some convenient relatively fixed part, as for instance associated with the housing or the control arm.

In Figs. 1 and 2, these stop means are in the form of a flared portion 20 extending radially outwardly at an angle from the top edge or rim of the spherical portion of the inner seal, said angle of flare C being 90° minus the angle of seal swing, this flared portion coming into abutment with the housing exterior surface that is above the height of the horizontal plane that may be passed through the center of curvature of said convex surface of the socket.

In Figure 3, these stop means are formed by providing a shoulder 21 on the housing, in the path of travel of the inner seal, this shoulder lying in the same plane as that passed through the center of curvature, horizontally, of the exterior convex surface of the socket member. Here, swing movement of the inner seal is limited when the advancing edge of the latter abuts said shoulder, thus insuring that there is no over-travel of the seal with consequent uncovering of the socket opening.

Figure 4:
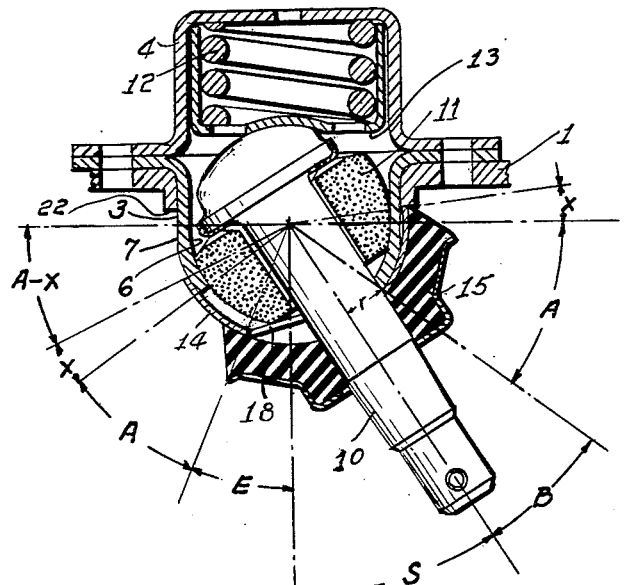
Figure 4 and Figure 5 show further modifications of seal devices and the stop means associated therewith, and wherein the seals have an overlap beyond the socket opening at the ends of stud swing.
Figure 5:
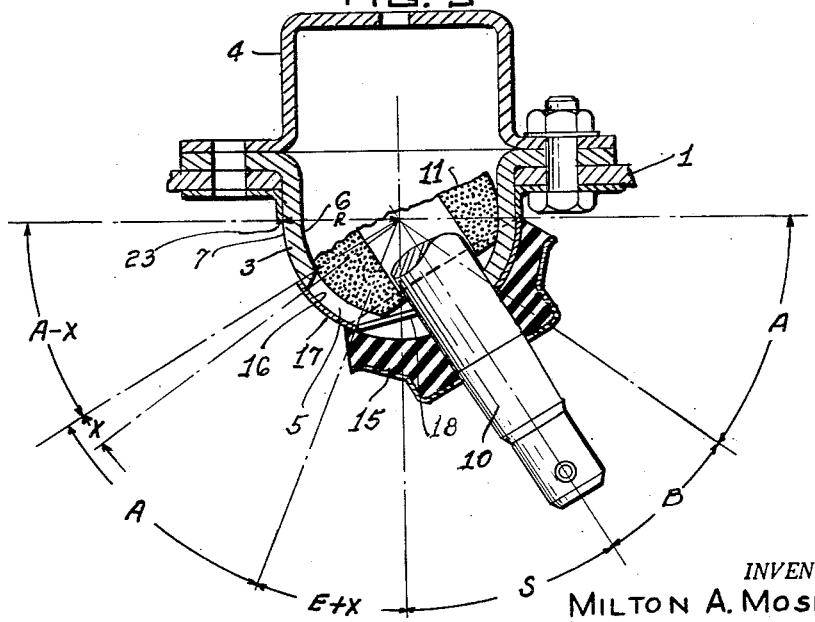

In some cases, it is preferred that there be some overlap by the seal, to cover the socket opening by a predetermining amount at the ends of swing, and as indicated in Figs. 4 and 5. This may be accomplished without change of swing amplitude, in several ways, two of which are about to be described in more detail.

In the modification shown in Fig. 4, the inner seal is of the kind shown in Fig. 3, in that it does not have its rim flared, but it is made deeper by an amount that is equal to twice the predetermined overlap, and there is a shoulder 22 associated with the control arm there shown, and in addition the exterior of the socket has been cut back or made substantially flat so that the socket element is reduced in cross section thereat, so that at the end limits of swing, the rim of said inner seal engages said shoulder to prevent any further advance in the direction in which it is being actuated.

In Fig. 5, the stop means is made by an auxiliary flange or shoulder 23 carried by the control arm, the end limit of inner seal swing in this case being at a point that lies approximately in the horizontal plane passed through the center of curvature of the convex surface of the socket member. This subtended angle of maximum swing of the inner seal is decreased by one-half of the amount of desired overlap.

It is sometimes desired to restrict the swing of the stud to substantially a single plane relative to the socket member, and as indicated in Figs. 6–8 inclusive wherein certain of the elements have been omitted for the sake of clarity.

The housing or socket member is again provided with an exterior segmentally spherical surface, with an opening through the bottom of the socket. However, in this instance, the opening 25 is made elongated and of a width approximately equal to that of the shank portion adjacent thereto, so that it is obvious that the swing of the stud is restricted to lengthwise of the opening.

The inner seal element is substantially as those previously described, having no flared upper edge however, so that its rim rides on or slidably engages the convex exterior surface of the socket member, the midpoint of seal swing being indicated in full lines in Fig. 8, while its position at one end of swing is indicated in dotted lines therein, the center of seal swing being in the same plane as that passed horizontally through the center of curvature of the said socket surface.

In order to confine the swing of the inner seal element to that substantially in a single plane, there is a shoulder 24 formed exteriorly of said socket member, said shoulder having its topmost portions at about the same plane as that passed horizontally through the common center of swing of the inner seal and of the convexity of the socket member, while the lowermost points of said shoulder is at about the height of the rim of the inner seal when the latter is at its center of swing (see Fig. 8).

It is apparent that in a device of such construction, the inner seal is confined to swing in substantially a single plane, the low points of the shoulder 24 preventing tilt of the seal upwardly in any direction except that lengthwise of the socket opening. At either end of swing, the advanced rim of the seal will abut the upper limit of the shoulder to limit further movement in a given direction.

It is preferred that the various proportions and dimensions of seal parts be ascertained with certainty in advance of construction so as to insure maximum coverage for each seal part, after first deciding on the diameter of stud required for strength, its amplitude of swing, curvature of the socket surfaces, and if overlap is desired, the amount of such overlap.

From these known factors it is possible to ascertain and calculate by formula, the minimum included or subtended angles of the dust seals and of other dimensions of these seals, as follows:

The known factors and the reference characters therefore, and as indicated in the drawings, are:

$r$=radius of stud shank at that portion that will engage the bounding edge of the socket opening
$C$=angle of flare of the rim of inner seal
$R$=radius of curvature of the convex bearing surface of socket
$B$=angle subtended between stud axis at end of swing and adjacent bounding edge of socket opening
$S$=subtended angle of stud swing to either side from mid-point
$X$=subtended angle of seal overlap desired at end of swing
$K$=actual distance of clearance between edge of inner seal at its mid-point of swing and fixed abutment It is assumed that all center lines are at 90° through the points of swing; that the stud swing cannot go past the horizontal plane through the center of curvature of the housing surfaces that are spherical; that all diameters are stated in terms of degrees; and that there is a symmetrical condition of movement about the vertical center line of the socket.

$C = 90° -$ angle of seal swing $$= 90° - \left(\frac{A-X}{2}\right)$$

$$= 90° - \left[\frac{S+B-(E+X)}{2}\right]$$

$$= 90° - \frac{A}{2}$$

By construction, it is seen that the angle subtended between the horizontal plane through the center of curvature and the bounding edge of the socket wall opening at one limit of swing, and which is indicated as the angle $A$ may be expressed as $A = 90° - (B+S)$.

The following are to be ascertained, in degrees:

I. Minimum angle subtended by the inside diameter of inner seal sufficient to just cover the socket opening at swing limits;

II. Minimum angle subtended by diameter of inner seal opening;

III. Maximum subtended angle of limits of inner seal swing to either side of mid-point;

IV. Minimum angle subtended across cocave end of outer seal that will engage the exterior surface of inner seal to either side of mid-point.

Where no overlap of the socket opening by the inner seal is desired, as in Figs. 1 and 2, the above-identified angles are determined as follows:

I. Minimum angle subtended by the inside diameter of inner seal sufficient to just cover the socket opening at swing limits $$= A+B+S+S+B$$

But, $$A+B+S = 90°$$

So, that by substitution, $$= 90° + (S+B)$$

II. Minimum angle subtended by diameter of inner seal opening $$= B+S+E$$

By construction, $E = 90° - 2A$, where $E$ is the remaining angle between the vertical center line and the adjacent edge of inner seal opening at maximum position of swing; hence $$= B+S+(90°-2A)$$

But, $$2A = 180° - 2S - 2B$$

$$= B+S+90° - (180°-2S-2B)$$

$$= 3B+3S-90°$$

III. Maximum angle subtended by inner seal swing to either side of mid-point, by construction $$= \frac{A}{2} \text{ or } \frac{S+B-E}{2}$$

Because $$E = 90° - 2A \text{ and } A = 90° - S - B$$

$$= 90° - (180° - 2S - 2B)$$

$$\frac{S+B-E}{2} = \frac{S+B-2S-2B+90°}{2} = \frac{-S-B+90°}{2} = \frac{A}{2}$$

IV. Minimum angle subtended across concave end of outer seal that will engage the exterior surface of inner seal to either side of mid-point $$= A+B+S+E$$

But, $$A+B+S = 90°$$

$$= 90° + E$$

Also, $$E = 90° - 2A$$

$$A = 90° - (S+B) = 90° - (180° - 2S - 2B)$$

$$= 2S+2B$$

The angle of flare of the inner seal rim $= 90° -$ angle of inner seal swing to either side of the vertical center.

Where overlap of the seal relative to the socket opening at an end of maximum swing is desired, and which angular amount of overlap of the inner seal in indicated as "X" in the drawings, this overlap may be secured in either of two ways, as follows:

First, as shown in Fig. 4, by deepening the inner seal element and without changing the angle of its maximum swing, allowing the seal to travel so that its advancing edge at the end of maximum swing is higher than the horizontal plane passed through the center of curvature of the convex surface of the socket, by said amount "X."

In this example, the relationships are:

I. Minimum angle subtended by the inside diameter of inner seal sufficient to overlap the socket opening by said predetermined amount at swing limits $$= X+A+B+S+B+S+X$$

But, $$A+B+S = 90°$$

$$= 90° + B+S+2X$$

II. Minimum angle subtended by diameter of inner seal opening $$= 3B+3S-90°$$

(same as for preceding determination for this angle, inasmuch there has been no change in this dimension).

III. Maximum subtended angle of limits of inner seal swing to either side of mid-point $$= \frac{A}{2} \text{ or } \frac{S+B-E}{2}$$

(same as for preceding determination for this angle; hence no change).

IV. Minimum angle subtended across concave end of outer seal that will engage exterior surface of inner seal to either side of mid-point $$= (90° + E) + 2X \text{ or } 2S + 2B + 2X$$

(see proof of preceding computation for this angle, and to which twice the desired angle of seal overlap mut be added).

Second, and as shown in Fig. 5, by increasing the size of the inner seal opening by the desired amount of angular overlap, keeping the limit stop positions at ends of maximum swing of inner seal at a point in the horizontal plane through the center of curvature, said overlap indicated as "X."

In this instance, the relationships are:

I. Minimum angle subtended by the inside diameter of inner seal that is sufficient to overlap the socket opening by the predetermined amount at the limits of swing $$= A + B + S + S + B + X$$

But, $$A + B + S = 90°$$

$$= 90° + S + B + X$$

II. Minimum angle subtended by diameter of inner seal opening $$= S + B + E + X \text{ or } 3S + 3B + X - 90°$$

Because $$E = 90° - 2A$$

(see proof for same angle as previously given without overlap, so that now, the desired overlap must be added for the dimension).

III. Maximum angle subtended by inner seal swing to either side of mid-point $$= \frac{S + B - (E + X)}{2} \text{ or } \frac{A - X}{2}$$

(see proof as previously given without overlap, so that herein one-half of the desired overlap must be subtracted from $$\frac{A}{2}$$

to obtain this dimension).

Because, housing opening $$= 2S + 2B$$

Inner seal opening $$= S + B + E + X \text{ or } 3S + 3B + X - 90°$$

Inner seal wall depth remaining for full swing after stud engages against socket wall opening $$= 2S + 2B - B - (E + X) - S$$

$$= S + B - (E + X)$$

and swing to either side $$= \frac{S + B - (E + X)}{2}$$

IV. Minimum angle subtended across concave end of outer seal that will engage exterior of inner seal to either side of mid-point $$= 90° + E + X \text{ or } 2S + 2B + X$$

By construction (see proof of preceding angle without overlap, and to which the desired overlap must now be added).

Having thus described my invention, it is obvious that various immaterial modifications may be made without departing from the spirit of the invention; hence I do not wish to be understood as limiting myself to the exact form, arrangement, construction and combination, except as limited by the state of the art to which this invention appertains, and by the claims here unto appended.

I claim:

1. The combination with a joint of the type that includes a hollow socket member having an opening therethrough and with an angularly tiltable stud therein, the shank of said stud projecting outwardly through said opening, and wherein said socket member has a convex exterior surface, of a dust seal to cover said opening at all degrees of stud tilt and be tiltably actuated by said stud and comprising a pair of nested slidably interengageable inner and outer seal members, the outer seal member bored for mounting on said stud shank, and said inner seal member provided with an opening therethrough larger than that through said outer seal member but which is smaller than said opening through said socket member, and stop means independent of said stud and fixedly associated with said socket member to limit advance of tilt in all directions of said inner seal member.

2. The combination with a joint of the type that includes a socket member with an opening therethrough and with an angularly tiltable stud therein and having a shank portion projecting outwardly through said opening, said socket member having a segmentally spherical convex exterior surface, of a dust seal mounted on said socket member to cover said opening at all degrees of stud tilt and comprising a pair of nested inner and outer seal members slidably interengageable and with the peripheral portion of said inner seal member slidably engaging said convex surface of said socket member during tilt of said seal member, said outer seal member having an opening to receive said stud shank and said inner seal member having an opening therethrough larger than that through said outer seal member, and stop means independent of said stud and operable at the end of stud tilt to halt further advance of said inner seal member.

3. A device as set forth in claim 1, but which is further modified in that said stop means are between said housing member and inner seal member and operable so that the leading portion of said inner seal member may advance to a point that is above the height of the horizontal plane passed through the center of curvature of said convex surface of the socket member.

4. A device as set forth in claim 1, but which is further modified in that said stop means includes an element fixedly associated with and exterior of said socket member and engageable with said inner seal.

5. A device as set forth in claim 1, but which is further modified in that said stop means includes a peripheral rim portion of said inner seal member and which is adapted to engage a fixed part associated with and exterior of said socket member.

6. A device as set forth in claim 2, but further modified in that said socket member opening is elongated, and said inner seal member is restricted to tilt in substantially only a single plane.

References Cited in the file of this patent

UNITED STATES PATENTS

| | | |
|---|---|---|
| 2,206,972 | Niles | July 9, 1940 |
| 2,486,246 | Beeke | Oct. 25, 1949 |
| 2,686,070 | Booth | Aug. 10, 1954 |